US010002343B2

(12) United States Patent
Atikoglu et al.

(10) Patent No.: US 10,002,343 B2
(45) Date of Patent: Jun. 19, 2018

(54) SYSTEM AND METHOD FOR CATALOG IMAGE GENERATION

(71) Applicant: Wal-Mart Stores, Inc., Bentonville, AR (US)

(72) Inventors: Berk Atikoglu, San Francisco, CA (US); Eytan Daniyalzade, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 523 days.

(21) Appl. No.: 14/656,450

(22) Filed: Mar. 12, 2015

(65) Prior Publication Data

US 2016/0267427 A1    Sep. 15, 2016

(51) Int. Cl.
| | | |
|---|---|---|
| *G06Q 10/08* | (2012.01) | |
| *G06Q 30/06* | (2012.01) | |
| *H04N 5/232* | (2006.01) | |
| *G11B 27/031* | (2006.01) | |
| *G06Q 20/20* | (2012.01) | |

(52) U.S. Cl.
CPC ......... *G06Q 10/087* (2013.01); *G06Q 20/203* (2013.01); *G06Q 30/0601* (2013.01); *G06Q 30/0603* (2013.01); *G06Q 30/0643* (2013.01); *G11B 27/031* (2013.01); *H04N 5/23206* (2013.01)

(58) Field of Classification Search
CPC . G06Q 20/203; G06Q 10/087; G06Q 30/0601
USPC .......................................... 705/28, 26.1, 22
See application file for complete search history.

(56) References Cited

U.S. PATENT DOCUMENTS

| | | | |
|---|---|---|---|
| 5,890,175 A * | 3/1999 | Wong ...................... | G06F 17/21 705/26.8 |
| 8,532,419 B2 | 9/2013 | Coleman | |
| 8,798,926 B2 | 8/2014 | Stroila et al. | |
| 9,171,278 B1 * | 10/2015 | Kong ................... | G06Q 10/087 |
| 2007/0262149 A1 * | 11/2007 | Knowles ............ | G06K 7/10693 235/462.01 |
| 2012/0259701 A1 * | 10/2012 | Kumazawa ........ | G06Q 30/0601 705/14.53 |
| 2013/0132190 A1 * | 5/2013 | Lagle Ruiz ........ | G06Q 30/0241 705/14.49 |
| 2013/0173430 A1 * | 7/2013 | Benjamin .......... | G06Q 30/0627 705/26.63 |
| 2014/0192205 A1 | 7/2014 | Bahadirov | |
| 2014/0209687 A1 * | 7/2014 | Cancro ................. | G06Q 30/02 235/472.01 |
| 2014/0348384 A1 * | 11/2014 | Kolehmainen ...... | G06Q 10/087 382/103 |

(Continued)

*Primary Examiner* — Florian M Zeender
*Assistant Examiner* — Christopher R Buchanan
(74) *Attorney, Agent, or Firm* — Bryan Cave Leighton Paisner LLP

(57) ABSTRACT

Various embodiments of system and method for catalog image generation include a method. The method comprises, while a first person is using a mobile device to scan an item in a store, capturing one or more first images of the item from the mobile device and selecting one of the one or more first images. In the method can further comprise uploading the one of the one or more first images to an online catalog for the store and providing instructions to display the one of the one or more first images to a second person. Other embodiments of related methods and systems are also provided.

20 Claims, 6 Drawing Sheets

(56) References Cited

U.S. PATENT DOCUMENTS

2015/0026019 A1* 1/2015 Lekas ............. G06Q 10/087
                                                705/28

* cited by examiner

600

605 – While a first person is using a mobile device to scan an item in a store, capturing one or more first images of the item from the mobile device

610 – Selecting one of the one or more first images

615 – Uploading the one of the one or more first images to an online catalog for the store

620 – Providing instructions to display the one of the one or more first images to a second person

625 – Prompting the second person to verify that the one of the one or more first images is accurate

FIG. 6

SYSTEM AND METHOD FOR CATALOG IMAGE GENERATION

TECHNICAL FIELD

This disclosure relates generally to systems for catalog image generation, and relates more particularly to systems to capture images of an item from a mobile device, and to related methods.

BACKGROUND

When shopping for items, some people search an online catalog for an item and/or use a mobile device to purchase the item. In some situations, the online catalog may not have an image of the item, and/or may not have multiple views of the item to display. Accordingly, there is a need for systems and methods to provide an image of the item for the online catalog.

BRIEF DESCRIPTION OF THE DRAWINGS

To facilitate further description of the embodiments, the following drawings are provided in which:

FIG. 6 illustrates a flow chart for a method, according to an embodiment.

Figure 1:
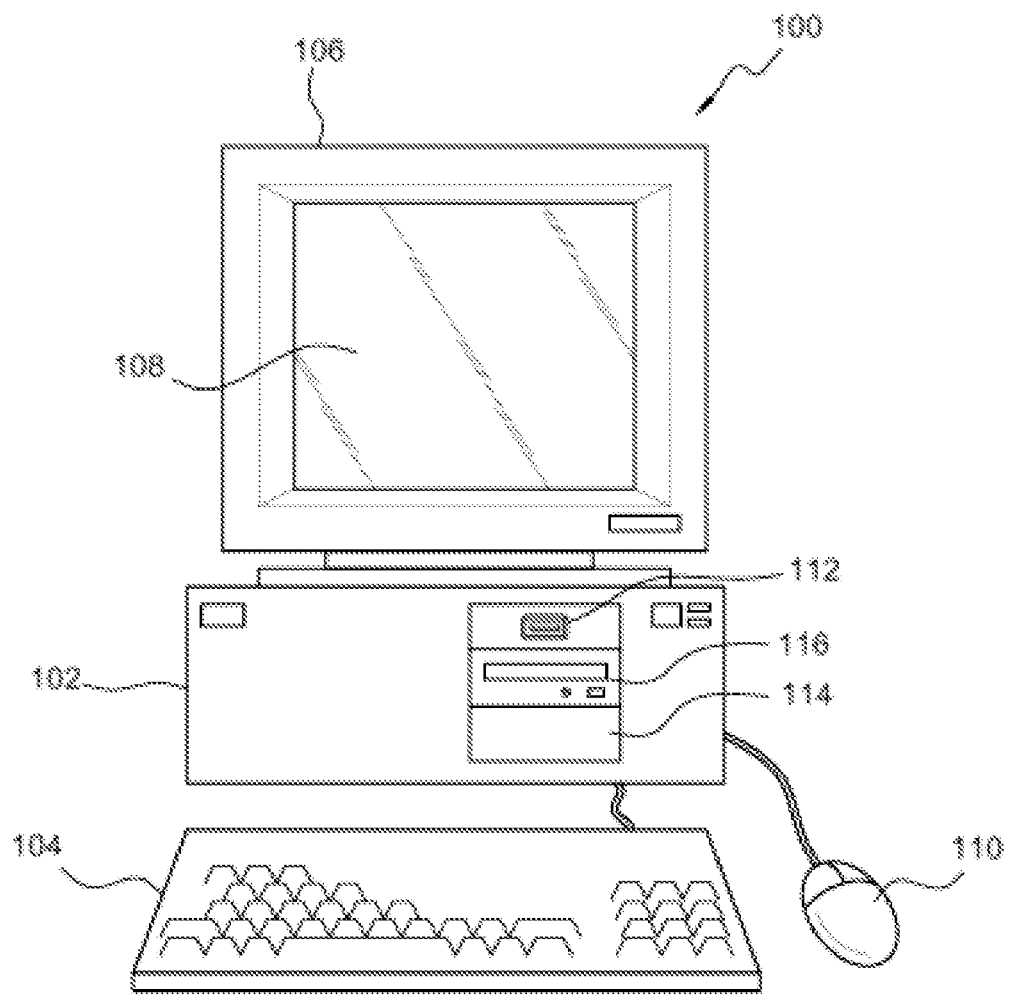
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments of system and method for catalog image generation include a method. The method comprises, while a first person is using a mobile device to scan an item in a store, capturing one or more first images of the item from the mobile device and selecting one of the one or more first images. In the method can further comprise uploading the one of the one or more first images to an online catalog for the store and providing instructions to display the one of the one or more first images to a second person.

In some embodiments, a system comprises one or more processing modules and one or more non-transitory storage modules storing computing instructions configured to run on the one or more processing modules and perform acts. The one or more non-transitory storage modules can perform the acts of while a first person is using a mobile device to scan an item in a store, capturing one or more first images of the item from the mobile device and selecting one of the one or more first images. The one or more non-transitory storage can further perform the acts of uploading the one of the one or more first images to an online catalog for the store and providing instructions to display the one of the one or more first images to a second person.

Many embodiments comprise at least one non-transitory memory storage module having computer instructions stored thereon executable by one or more processing modules. The at least one non-transitory memory storage module having computer instructions stored thereon are executable by one or more processing modules to while a first person is using a mobile device to scan an item in a store, capture one or more first images of the item from the mobile device and select one of the one or more first images. The at least one non-transitory memory storage module having computer instructions stored thereon are executable by one or more processing modules to further upload the one of the one or more first images to an online catalog for the store and provide instructions to display the one of the one or more first images to a second person.

Figure 2:
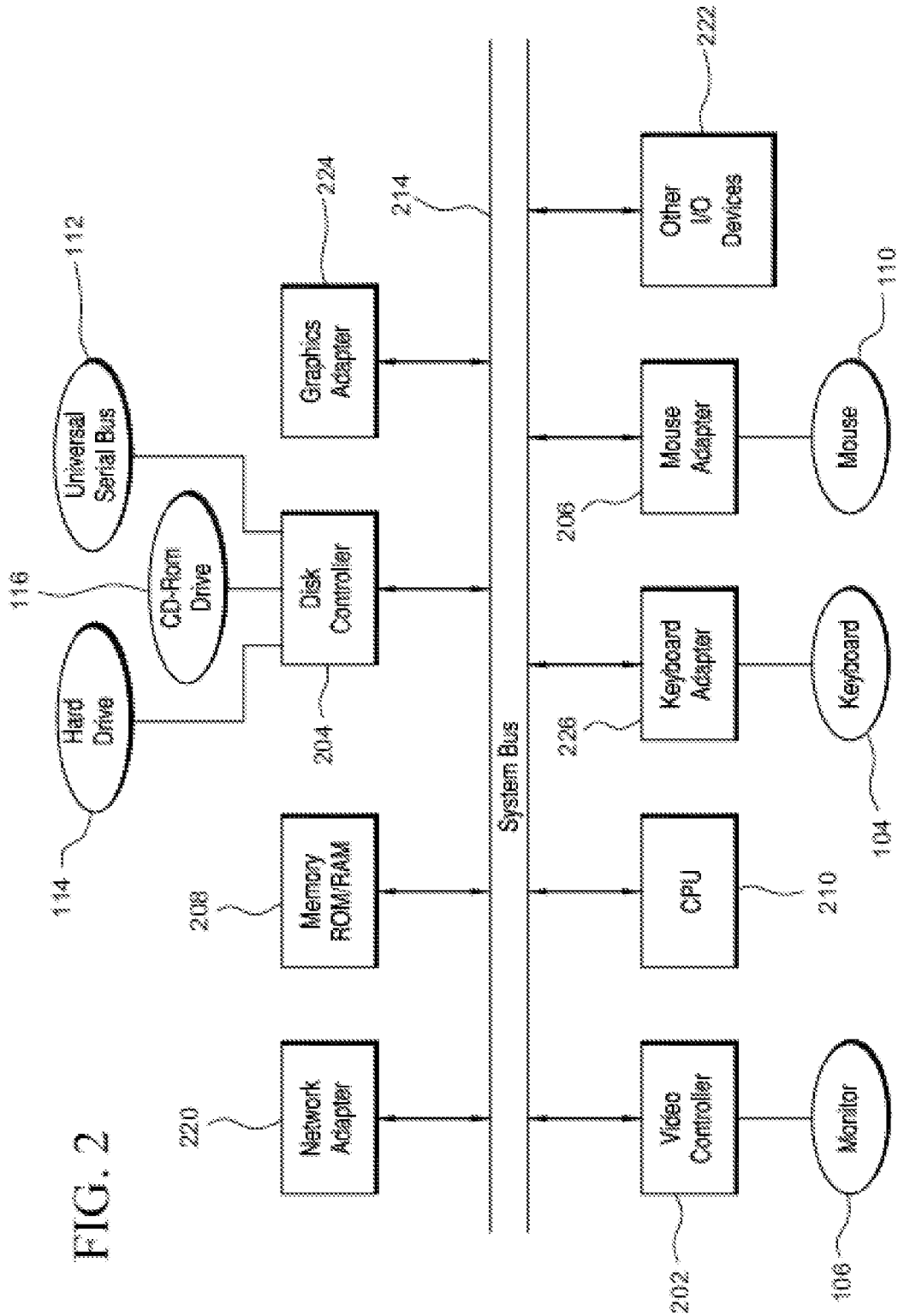
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
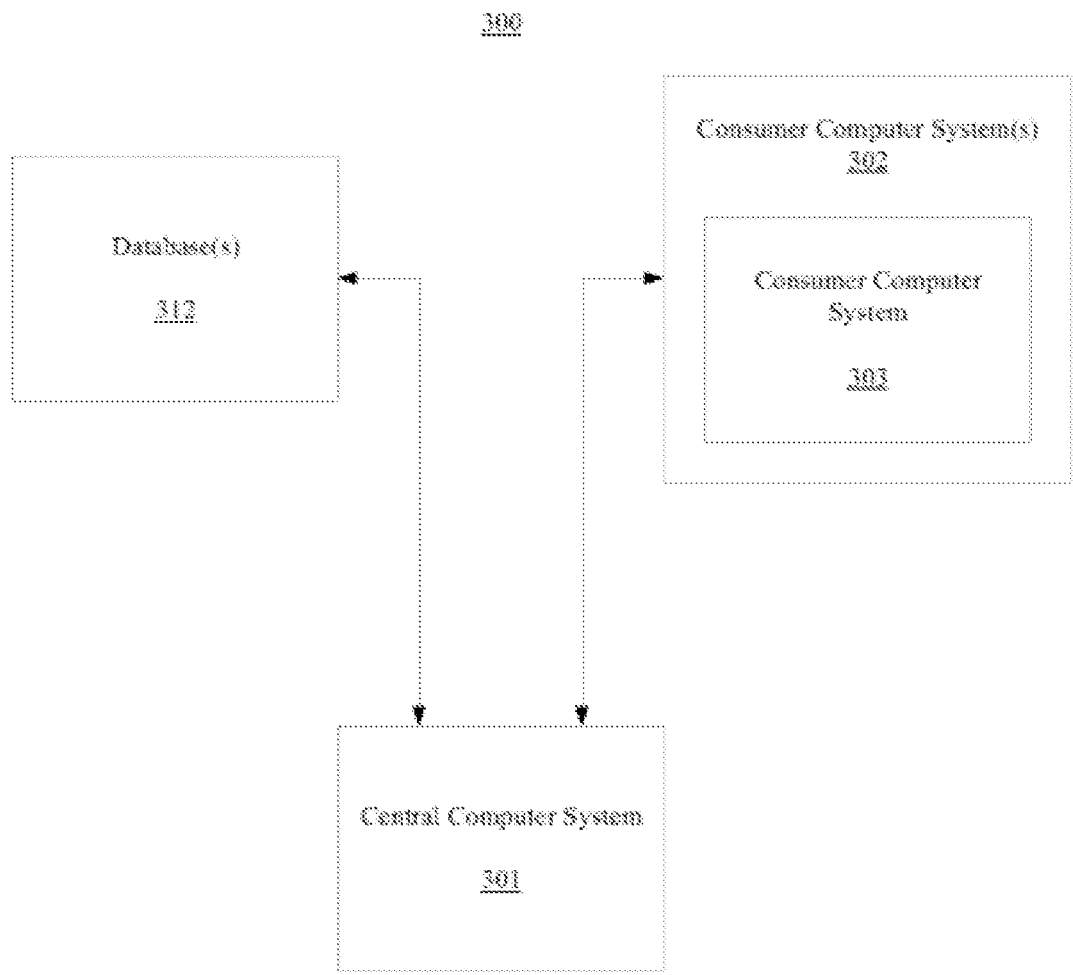
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more acts performed by the consumer; and reactive acts can refer to acts (e.g., identification, determination, communication, etc.) performed with consideration of (i.e., in response to) one or more acts performed by the consumer. For example, in some embodiments, the act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile electronic devices, etc. At least part of central computer system 301 can be located remotely from consumer computer system(s) 302.

In some embodiments, a mobile electronic device can refer to a portable electronic device (e.g., an electronic device easily conveyable by hand by a person of average size) with the capability to present audio and/or visual data (e.g., images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ or a similar product by Google Inc. of Menlo Park, Calif., United States of America; (ii) the Eye Tap™, the Laser Eye Tap™, or a similar product by ePI Lab of Toronto, Ontario, Canada, and/or (iii) the Raptyr™, the STAR 1200™, the Vuzix Smart Glasses M100™, or a similar product by Vuzix Corporation of Rochester, N.Y., United States of America. In other specific examples, a head mountable wearable user computer device can comprise the Virtual Retinal Display™, or similar product by the University of Washington of Seattle, Wash., United States of America. Meanwhile, in further specific examples, a limb mountable wearable user computer device can comprise the iWatch™, or similar product by Apple Inc. of Cupertino, Calif., United States of America, the Galaxy Gear or similar product of Samsung Group of Samsung Town, Seoul, South Korea, the Moto 360 or similar product of Motorola of Schaumburg, Ill., United States of America, and/or the Zip™, One™, Flex™, Charge™, Surge™, or similar product by Fitbit Inc. of San Francisco, Calif., United States of America.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer, but in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile electronic device), such as, for example, when interfacing with central computer system 301 away from home.

In many types of retail businesses, the retail business uses a checkout model for purchases. A consumer chooses one or more items that he/she wishes to purchase. The consumer then presents the one or more items to an employee of the retail business. The employee proceeds to determine the total cost of the items, receives payment from the consumer, then provides the items to the consumer.

There are various alternative arrangements for allowing a consumer to purchase items from a brick and mortar retail business. For example, there is the "self-checkout" model. In the self-checkout model, after a consumer selects the goods he wishes to purchase, the consumer scans items for purchases. Generally, there are one or more self-checkout stands in one area of the brick and mortar retail business. Thus, one employee can monitor the check-out of multiple consumers at the same time, instead of needing one employee for each line of consumers.

A novel method of allowing consumers to shop is a technology that some retailers call scan and go. Briefly, in a scan and go methodology, a consumer uses a mobile electronic device to indicate his purchases as he travels through a retailer. When he wants to leave the retailer, he performs a checkout. To more thoroughly describe this process, refer to FIG. 4.

Figure 4:
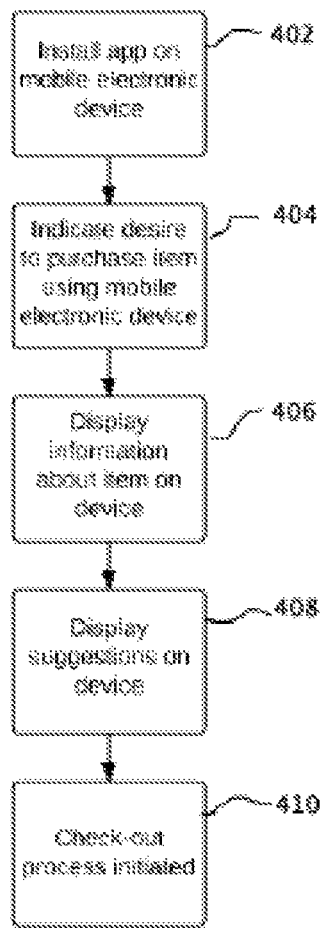
FIG. 4 is a flowchart illustrating a method of a scan and go methodology according to an embodiment.

A flowchart illustrating the operation of a scan and go methodology 400 is presented in FIG. 4. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, portions of method 400 can be implemented by computer system 100 (FIG. 1).

A consumer installs an app on a mobile electronic device (block 402). Referring back to FIG. 3, the mobile electronic device can be one of consumer computer system(s) 302. As described above, a variety of different mobile electronic devices can be used. A smartphone would be the most common type of portable electronic device that would be used in such a scenario. Other mobile electronic devices such as phablets, tablets, portable music players, special-purpose scanning devices, wearable electronic devices, and other electronic devices that have internet connectivity also can be used. In some embodiments, instead of a consumer installing an app on his mobile electronic device, a consumer can use a special-purpose electronic device provided by the retailer.

Returning to FIG. 4, the consumer then travels through a retailer's store to find items he wishes to purchase. When he finds an item he wishes to purchase, he uses the mobile electronic device to indicate the desire to purchase the item (block 404). This indication can be accomplished in one of a variety of different manners.

For example, as described above, there can be an application (also known as an "app") in a mobile electronic device that can provide a consumer with the ability to scan items to be purchased. The app would use a camera of the mobile electronic device to scan or to take a photograph of the universal product code (UPC), international standard book number (ISBN), or other unique identifier of the product that the consumer wishes to purchase. With reference to FIG. 3, the mobile electronic device (e.g., consumer computer system 303) can be in communication with central computer system 301. Central computer system 301 is in communication with one or more databases 312. Among databases 312, there can be a product database containing information about each product sold by the retailer.

Returning to FIG. 3, the app then searches a database (such as a product database) to find the product and displays information about the product on the mobile electronic device (block 406). The user can be provided with an opportunity to confirm the purchase. In some embodiments, the app also can provide suggestions to the consumer (block 408). For example, the app can inform the consumer that a different size of the product is on sale. The app can suggest products that are often purchased with the chosen product (e.g., suggesting fabric softener when a consumer chooses a laundry detergent). Many other features also can be present.

After the consumer finishes shopping, the consumer approaches a checkout area of the retailer. However, because the consumer already scanned each of the items he wishes to purchase using the mobile electronic device in some embodiments, he does not need to scan the items again. Instead, In some embodiments, the consumer needs only to pay for the items. The consumer begins the checkout process (block 410). This can involve using the mobile electronic device to enter payment information. In some embodiments, the consumer has the capability to provide and store payment information into the mobile electronic device. For example, the consumer can store credit card information (such as an account number, an expiration date, and a card security code) in the mobile electronic device. In that type of situation, the consumer can indicate his desire to apply the previously entered payment information to the purchase. The consumer also can pay for the selected goods using cash or a check through a terminal at the retailer. The consumer will typically place the purchase products in plastic bags, paper bags, reusable bags, boxes, and the like for ease in transporting the goods.

Figure 5:
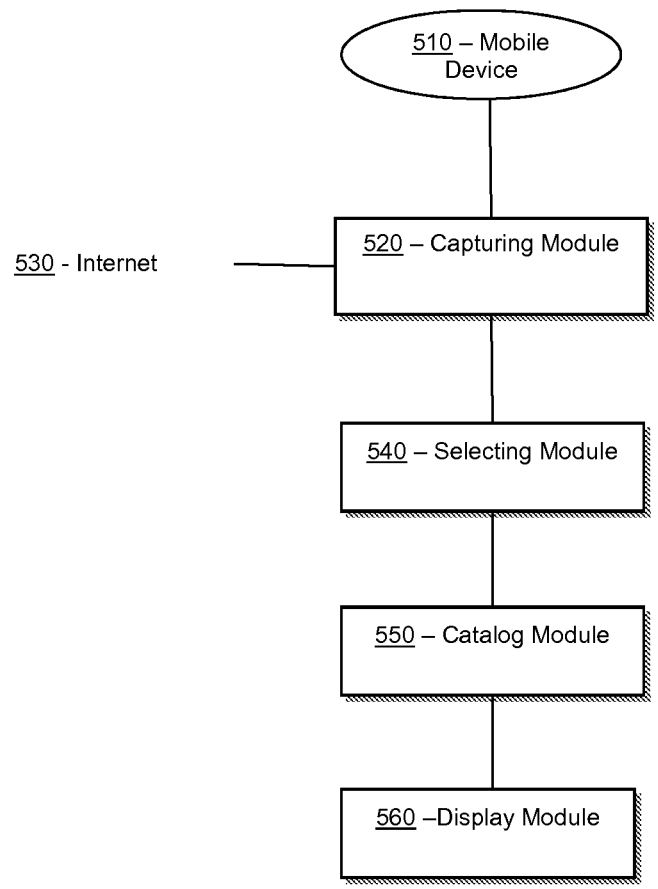
FIG. 5 illustrates a representative block diagram of a system, according to an embodiment.

Skipping ahead now in the drawings, FIG. 5 illustrates a representative block diagram of a system 500, according to an embodiment. System 500 is merely exemplary and embodiments of the system are not limited to the embodiments presented herein. System 500 can be employed in many different embodiments or examples not specifically depicted or described herein. In some embodiments, certain elements or modules of system 500 can perform various methods and/or activities of those methods. In these or other embodiments, the methods and/or the activities of the methods can be performed by other suitable elements or modules of system 500. System 500 can comprise one or more processing modules and one or more non-transitory storage modules storing computing instructions configured to run on the one or more processing modules and perform the acts. In many embodiments, the modules of system 500 can perform the acts of method 600 (FIG. 6).

As described in greater detail below, system 500 can be operable to generate an image for a catalog, for example, generating an image for an online catalog. As also described in greater detail below, in many embodiments, system 500 can be further operable to permit the consumer to engage in electronically implemented brick-and-mortar (i.e., scan and go) commerce. In these embodiments, by making mobile checkout readily available for the consumer, system 500 can facilitate scan and go commerce.

In many embodiments, system 500 can comprise non-transitory memory storage modules 520, 540, 550, and 560. Such non-transitory memory storage modules can be part of a computer system such as central computer system 301 (FIG. 3). Memory storage module 520 also can be referred to as a capturing module 520. Capturing module 520 can capture one or more first images of an item from a mobile device 510. In some embodiments, Mobile device 510 can be similar or identical to the mobile electronic device described above, such as consumer computer system 303 (FIG. 3). In many embodiments, a first person can use the mobile device to shop for items in a store. In some embodiments, an application (e.g. a Scan & Go application) can be downloaded onto the mobile device. The application can enable the first person to shop by scanning the item. In other embodiments, the first person can scan items through a program that is run within a web browser via internet 530. In some embodiments, internet 530 can comprise the world wide web, and can include a central computer system such as central computer system 301 (FIG. 3). In some embodiments, internet 530 can comprise an intranet. In some embodiments, system 500 requests permission from the person using mobile device 510 to capture one or more images. In many embodiments, receiving permission can comprise receiving permission to capture the one or more images, and/or receiving permission can comprise receiving permission to upload the one of the one or more images. In some embodiments, the permission to capture and/or upload the one or more images can be received when the application is downloaded onto the mobile device. In some embodiments, capturing module 520 requires the first person to indicate or grant permission to capture the one or more images. In some embodiments, system 500 does not request permission from the first person to capture the one or more images.

In some embodiments, a first person can scan the item (e.g. a barcode, such as a universal product code (UPC), or other item identifying information) using mobile device 510. In many embodiments, the first person uses a camera associated with mobile device 510 to scan the item. While the first person scans the item, capturing module 520 can capture one or more first images of the item from mobile device 510. In some embodiments, capturing module 520 can capture one or more first images of the item from a video stream of mobile device 510. In many embodiments, capturing module 520 can capture the one or more first images even if the first person is not actively recording a video or taking a picture, including before and/or after the first person actively records the video or takes the picture. For example, in some embodiments, when the first person turns on the camera application on mobile device 510, capturing module 520 can capture one or more still images without further action from the first person. In many embodiments, capturing module 520 can capture the one or more still images approximately every 0.5 seconds to approximately every 5 seconds from the video stream of mobile device 510. In some embodiments, capturing module 520 can capture the one or more still images approximately every 1 or 2 seconds from the video stream of mobile device 510.

Memory storage module 540 also can be referred to as a selecting module 540. Selecting module 540 can select one of the one or more first images. In some embodiments, selecting module 540 can select one of the one or more first images captured by capturing module 520. The section of the one or more first images can be performed with or without human intervention.

In many embodiments, selecting module 540 also can edit the one or more first images. Editing the one of the one or more first images can comprise photoshopping or graphics editing the one of the one or more first images. In some embodiments, editing the one of the one or more first images can comprise combining at least a portion of a second one of the one or more first images into the one of the one or more first images. In some embodiments, editing the one of the one or more first images can comprise editing one or more second images of another one of the same item captured from a second mobile device of a third person, and editing at least a portion of one of the one or more second images into the one of the one or more first images. In some embodiments, the first person, the third person or any other person viewing the one of the one or more first images can assist selecting module 540 in the editing of the one of the one or more first images.

Memory storage module 550 also can be referred to as a catalog module 550. In many embodiments, catalog module 550 can determine if the online catalog comprises an item image of the item. Catalog module 550 also can determine if the online catalog comprises at least one of a front view, a back view, a side view, and/or a perspective view. In some embodiments, determining if the online catalog comprises the item image of the item can comprise determining if the online catalog comprises views of the item in different colors, sizes, and/or styles. For example, if an image of a shirt in red is the only image of the shirt in the online catalog, catalog module 550 can determine that an image of the shirt in blue is not available. In some embodiments, if the online catalog does not comprise the item image of the item, catalog module 550 can further comprise an activity of initiating the capturing of the one or more first images of the item. Catalog module 550 can send instructions to capturing module 520 to capture one or more images of the item. In many embodiments, catalog module 550 can upload the one of the one or more first images to the online catalog for the store.

Memory storage module 560 also can be referred to as a display module 560. Display module 560 can provide instructions to display the one of the one or more first images to a second person. In some embodiments, the second person can comprise at least one of the first person or a different person. In some embodiments, display module 560 can provide instructions to display a credit line for the one of the one or more first images, wherein the credit line gives attribution to the first person for the one of the one or more first images. The credit line also can give attribution to the third person and any other person who contributed to the image (including its editing) of the item that is shown in the online catalog. In some embodiments, display module 560 can provide instructions to display more than one image of the item in the online catalog.

Turning ahead in the drawings, FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 500 (FIG. 5) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules 520, 540, 550, and/or 560 (FIG. 5). The processing module(s) can be similar or identical to the processing module(s) described above with respect to computer system 100 (FIG. 1).

In various embodiments, method 600 can comprise an activity of determining if the online catalog comprises an item image of the item. In some embodiments, determining if the online catalog comprises the item image of the item can comprise determining if the online catalog comprises at least one of a front view, a back view, a side view, or a perspective view. In some embodiments, determining if the online catalog comprises the item image of the item can comprise determining if the online catalog comprises views of the item in different colors, sizes, and/or styles. For example, if an image of a shirt in red is in the online catalog, method 600 can determine that an image of the shirt in blue is not available. In some embodiments, if the online catalog does not comprise the item image of the item, method 600 can further comprise an activity of initiating the capturing of the one or more first images of the item.

In many embodiments, method 600 can comprise an activity 605 of, while a first person is using a mobile device to scan an item in a store, capturing one or more first images of the item from the mobile device. In many embodiments, the mobile device can be similar or identical to mobile device 510 (FIG. 5). In many embodiments, the first person can use the mobile device while shopping for items inside a physical "brick and mortar" store. In some embodiments, an application (e.g. a Scan & Go application) can be downloaded onto the mobile device. The application can enable the first person to shop by scanning the item while the first person is inside the store. In other embodiments, the first person can scan items through a program that is run within a web browser via the internet while the first person is not inside the store.

In some embodiments, the first person can scan the item (e.g. a barcode, such as a universal product code (UPC), or other item identifying information). In many embodiments, the first person uses a camera associated with the mobile device to scan the item. While the first person scans the item, one or more first images of the item can be captured from the mobile device. In some embodiments, capturing one or more first images of the item can comprise capturing one or more still images from a video stream of the mobile device. In many embodiments, the one or more first images can be captured even if the first person is not actively recording a video or taking a picture. For example, in some embodiments, when the first person turns on the camera application on the mobile device, one or more first images can be captured without further action from the first person. In many embodiments, the one or more still images are captured approximately every 0.5 seconds to approximately every 5 seconds from the video stream of the mobile device. In some embodiments, the one or more still images are captured approximately every 1 to 2 seconds from the video stream of the mobile device.

Method 600 can further comprise an activity 610 of selecting one of the one or more first images. In many embodiments, activity 610 of selecting one of the one or more first images can comprise editing the one of the one or more first images. In some embodiments, editing the one of the one or more first images can comprise editing at least a portion of a second one of the one or more first images into the one of the one or more first images. In some embodiments, editing the one of the one or more first images can comprise capturing one or more second images of the item from a second mobile device of a third person, and/or can comprise editing at least a portion of one of the one or more second images into the one of the one or more first images. Editing the one of the one or more first images can comprise photoshopping or graphics editing the one of the one or more first images. In some embodiments, the first person or any other person viewing the one of the one or more first images can assist in the editing of the one of the one or more first images. In some embodiments, the editing can be done by an algorithm or selecting module, such as selecting module 540 (FIG. 5).

In many embodiments, method 600 can comprise an activity 615 of uploading the one of the one or more first images to an online catalog for the store, and an activity 620 of providing instructions to display the one of the one or more first images to a second person. In some embodiments, the second person can comprise at least one of the first person or a different person. In some embodiments, providing instructions to display the one of the one or more first images can comprise providing instructions to display a credit line for the one of the one or more first images, wherein the credit line gives attribution to the first person for the one of the one or more first images.

In some embodiments, method 600 also can comprise an activity of receiving permission from the person using the mobile device. In many embodiments, receiving permission can comprise receiving permission to capture the one or more images or receiving permission to upload the one of the one or more images. In some embodiments, the permission to capture or upload the one or more images can be received when the application is downloaded onto the mobile device.

In some embodiments, method 600 also can comprise an activity 625 of prompting the second person to verify that the one of the one or more first images is accurate. In some embodiments, a prompt can be sent to the second person asking if the image is correct. In many embodiments, if a positive response is received from the second person, then method 600 can upload the image to the online catalog, such as in activity 615 of uploading the one of the one or more first images to an online catalog for the store. In some embodiments, if a negative response is received from the second person, then the image can be sent to a reviewer for approval before uploading to the online catalog.

Although systems and methods for a catalog image generation have been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the activities of FIG. 6 may include different activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
providing an application (app) for installation on first and second mobile devices enabling first and second customers to (a) shop by scanning an item or packaging for the item in a brick and mortar store using a camera of the first or second mobile devices, and (b) interact with a central computer system comprising a catalog system, a capture system, and a selecting system;
receiving, at the capture system, permission from the first and second customers via apps installed on the first and second mobile devices to (a) capture one or more first and second images or (b) upload the one or more first and second images;

determining, with the central computer system using one or more processors, whether an online catalog comprises an image of the item or the packaging for the item for sale listed in the online catalog; and when the online catalog does not comprise the image of the item or the packaging for the item for sale listed in the online catalog:

while the first customer is using the first mobile device to scan a product identifier on or attached to the item or the packaging for the item in the brick and mortar store, using the camera of the first mobile device to capture the one or more first images of the item or the packaging for the item;

while the second customer is using the camera of the second mobile device to scan the product identifier on or attached to the item or the packaging for the item in the brick and mortar store, using the camera of the second mobile device to capture the one or more second images of the item or the packaging for the item;

receiving, at the capture system, from the first and second mobile devices the one or more first and second images;

selecting, with the selecting system, at least one of the one or more first and second images;

editing, with the selecting system, the at least one of the one or more first and second images, as selected;

uploading, with the catalog system, the at least one of the one or more first and second images, as edited, from the selecting system, to the online catalog for an online store; and displaying, with the catalog system, the at least one of the one or more first and second images in the online catalog to a third customer.

2. The method of claim 1, wherein:
the second customer comprises at least one of:
the first customer; or
a different customer.

3. The method of claim 1, wherein:
editing the at least one of the one or more first and second images comprises editing the at least one of the one or more first and second images by photoshopping or graphics editing.

4. The method of claim 3, wherein:
editing the at least one of the one or more first and second images comprises editing at least a portion of a second image of the one or more first or second images into the at least one of the one or more first and second images.

5. The method of claim 3, further comprising:
capturing one or more third images of the item or the packaging of the item from a third mobile device of the third customer;
wherein:
editing the at least one of the one or more first and second images comprises:
editing at least a portion of one of the one or more third images into the at least one of the one or more first and second images.

6. The method of claim 1, wherein:
displaying the at least one of the one or more first and second images further comprises displaying a credit line for the at least one of the one or more first and second images, wherein the credit line gives attribution to the first and second customers that contributed to the at least one of the one or more first and second images.

7. The method of claim 1, wherein:
using the camera of the first mobile device to capture the one or more first images comprises capturing one or more still images from a video stream of the first mobile device.

8. The method of claim 7, wherein:
the one or more still images are automatically captured approximately every 1 second from the video stream of the first mobile device.

9. The method of claim 1, further comprising:
prompting the third customer to verify that the at least one of the one or more first and second images, as edited, is accurate.

10. The method of claim 1, wherein:
determining when the online catalog comprises the image of the item or the packaging for the item comprises determining when the image comprises at least one of:
a front view of the item or the packaging for the item;
a back view of the item or the packaging for the item;
a side view of the item or the packaging for the item; or
a perspective view of the item or the packaging for the item.

11. A system comprising:
one or more processing modules; and
one or more non-transitory storage modules storing computing instructions configured to run on the one or more processing modules and perform acts of:
providing an application (app) for installation on first and second mobile devices enabling first and second customers to (a) shop by scanning an item or packaging for the item in a brick and mortar store using a camera of the first or second mobile devices, and (b) interact with a central computer system comprising a catalog system, a capture system, and a selecting system;

receiving permission from the first and second customers via apps installed on the first and second mobile devices to (a) capture one or more first and second images or (b) upload the one or more first and second images;

determining whether an online catalog comprises an image of the item or the packaging for the item for sale listed in the online catalog; and when the online catalog does not comprise the image of the item or the packaging for the item for sale listed in the online catalog:

while the first customer is using the first mobile device to scan a product identifier on or attached to the item or the packaging for the item in the brick and mortar store, using the camera of the first mobile device to capture the one or more first images of the item or the packaging for the item;

while the second customer is using the camera of the second mobile device to scan the product identifier on or attached to the item or the packaging for the item in the brick and mortar store, using the camera of the second mobile device to capture the one or more second images of the item or the packaging for the item;

receiving from the first and second mobile devices the one or more first and second images;

selecting at least one of the one or more first and second images;

editing the at least one of the one or more first and second images, as selected;

uploading the at least one of the one or more first and second images, as edited, from the selecting system, to the online catalog for an online store; and displaying an at least one of the one or more first and second images in the online catalog to a third customer.

12. The system of claim 11, wherein:

editing the at least one of the one or more first and second images comprises editing the at least one of the one or more first and second images by photoshopping or graphics editing.

13. The system of claim 12, wherein:

editing the at least one of the one or more first and second images comprises editing at least a portion of a second image of the one or more first or second images into the at least one of the one or more first and second images.

14. The system of claim 12, further comprising:

capturing one or more third images of the item or the packaging of the item from a third mobile device of the third customer;

wherein:

editing the at least one of the one or more first and second images comprises:

editing at least a portion of the one or more third images into the at least one of the one or more first and second images.

15. The system of claim 11, wherein:

using the camera of the first mobile device to capture the one or more first images comprises capturing one or more still images from a video stream of the first mobile device.

16. The system of claim 15, wherein:

the one or more still images are automatically captured approximately every 1 second from the video stream of the first mobile device.

17. The system of claim 11, further comprising:

displaying the at least one of the one or more first and second images further comprises displaying a credit line for the at least one of the one or more first and second images, wherein the credit line gives attribution to the first and second customers that contributed to the at least one of the one or more first and second images.

18. At least one non-transitory memory storage module having computer instructions stored thereon executable by one or more processing modules to:

provide an application (app) for installation on first and second mobile devices enabling first and second customers to (a) shop by scanning an item or packaging for the item in a brick and mortar store using a camera of the first or second mobile devices, and (b) interact with a central computer system comprising a catalog system, a capture system, and a selecting system;

receive permission from the first and second customers via apps installed on the first and second mobile devices to (a) capture one or more first and second images or (b) upload the one or more first and second images;

determine whether an online catalog comprises an image of the item or the packaging for the item for sale listed in the online catalog; and when the online catalog does not comprise the image of the item or the packaging for the item for sale listed in the online catalog:

while the first customer is using the first mobile device to scan a product identifier on or attached to the item or the packaging for the item in the brick and mortar store, using the camera of the first mobile device to capture the one or more first images of the item or the packaging for the item;

while the second customer is using the camera of the second mobile device to scan the product identifier on or attached to the item or the packaging for the item in the brick and mortar store, using the camera of the second mobile device to capture the one or more second images of the item or the packaging for the item;

receive from the first and second mobile devices the one or more first and second images;

select at least one of the one or more first and second images;

edit the at least one of the one or more first and second images, as selected;

upload the at least one of the one or more first and second images, as edited, from the selecting system, to an online catalog for an online store; and display the at least one of the one or more first and second images in the online catalog to a third customer.

19. The at least one non-transitory memory storage module of claim 18, wherein:

using the camera of the first mobile device to capture the one or more first images comprises capturing one or more still images from a video stream of the first mobile device; and editing the at least one of the one or more first and second images comprises editing the at least one of the one or more first and second images by photoshopping or graphics editing.

20. The at least one non-transitory memory storage module of claim 18, further comprises:

display the at least one of the one or more first and second images further comprises displaying a credit line for the at least one of the one or more first and second images, wherein the credit line gives attribution to the first and second customers that contributed to the at least one of the one or more first and second images.

* * * * *